(No Model.)
E. A. COOK, J. D. SHORTS & D. STARING.
STEEL TRAP.
No. 312,094. Patented Feb. 10, 1885.
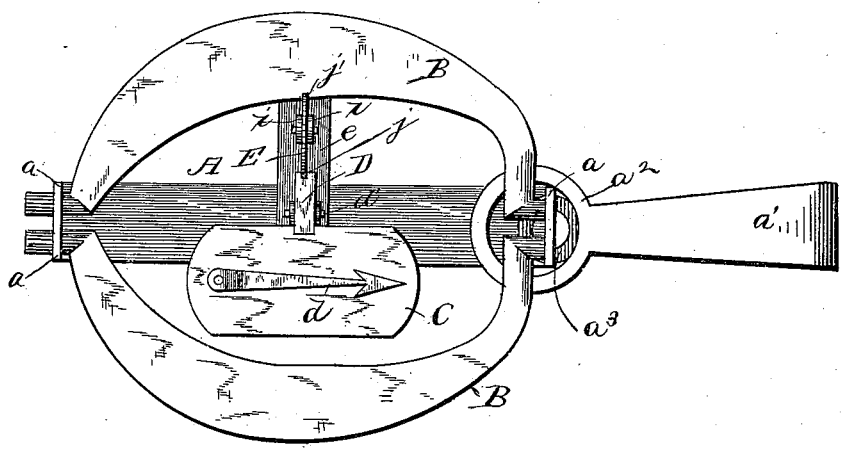
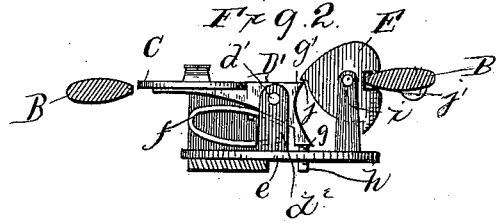
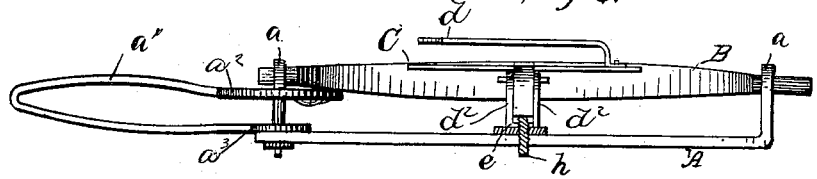
Inventors
Enos A. Cook
James D. Shoots
DeWitt Staring
WITNESSES:
ATTORNEYS.

UNITED STATES PATENT OFFICE.

ENOS A. COOK, JAMES D. SHOOTS, AND DEWITT STARING, OF HORSEHEADS, NEW YORK.

STEEL-TRAP.

SPECIFICATION forming part of Letters Patent No. 312,094, dated February 10, 1885.

Application filed March 13, 1884. (No model.)

*To all whom it may concern:*

Be it known that we, ENOS A. COOK, JAMES D. SHOOTS, and DEWITT STARING, citizens of the United States of America, residing at Horseheads, in the county of Chemung and State of New York, have invented certain new and useful Improvements in Steel-Traps, of which the following is a specification, reference being had therein to the accompanying drawings.

This invention pertains to improvements in animal-traps, having for its object, while adapted to effectively entrap and secure the animal, more especially to prevent the animal from extricating itself and escaping; and it consists of the detailed construction and combination of parts, substantially as hereinafter fully set forth, and pointed out in the claims.

In the accompanying drawings, Figure 1 is a plan view of our trap set. Fig. 2 is a sectional elevation thereof; and Fig. 3 is a sectional view at right angles to Fig. 2, taken through the trip-adjusting screw. Fig. 4 is a detail view.

In carrying out our invention we employ a suitable base bar or support, A, upon which, at its ends, are secured or formed apertured studs or ears $a\ a$, to receive and permit the pivoting therein of jaws B B. These jaws are actuated or held under tension or spring-pressure, the springs being applied to act upon their pivotal ends, and so as, in the absence of resistance, to spring or force them together. The bent spring $a'$ is provided at its ends with the eyes $a^2\ a^3$, and has projecting through its lower eye, $a^3$, the apertured stud $a$, said stud being enlarged at its upper end, as shown in Fig. 4, and is provided with apertures for reception of the horizontal ends of the clamping-jaws B B, which are forced together by the retractile force of the spring when the trap is sprung.

C is the tilting or tripping platform, upon which is mounted, so as to transversely project over the platform A, and is provided with the bait-holding bar $d$, with barbs at its holding end, to prevent the bait being taken by the animal. This platform C is itself mounted and secured upon the tripping device D, which consists of a lever, D', with its upper inner end fulcrumed by a pin, $d'$, between two studs, $d^2$ $d^2$, cast or secured upon a lateral bar or arm, $e$, which is rigidly secured to the support A, while to the under side of said lever, outward from its pivot or fulcrum, is secured the inner upper end of a strong, preferably plate, spring, $f$, the inner lower end of said spring resting upon the lateral bar $e$ between the studs $d^2\ d^2$. The normal action of said spring is to resist downward pressure, holding said platform level and said lever horizontal. The inner end of the lever or tripping device D' is concaved, having two salient points, $g\ g'$, against the under side of the lower one of which bears an adjusting-screw, $h$, working in the lateral bar or arm $e$, to vary the plane of engagement of the other or upper point, $g'$, with the setting cam or catch, (presently explained,) as circumstances may require, to render the tripping action of the parts more or less sensitive.

E is the setting-cam, hung in the slot of a bifurcated post, $i$, or between two studs brazed or otherwise fastened upon the outer end of the lateral bar or arm $e$, said cam having a shoulder, $j$, on that side of its periphery next to the salient point $g'$ of the tripping-lever D', and with which it is adapted to engage, so that said point will rest under the shoulder $j$ of the cam when the trap is set. The opposite edge of the cam is provided with a notch or recess, $j'$, which receives the inner edge of one of the jaws B when the trap is set. The relative arrangement or disposition of the notch and shoulder of the cam and of the salient point $g'$ of the tripping-lever is such that previous to the jaws reaching their lowest point of opening or depression one of said jaws will begin to enter the notch, and that as said jaw with its fellow continues to be depressed it will act upon said cam and bring the upper shoulder of the notch of said cam upon said jaw, which shoulder of said notch will be brought into a horizontal plane upon said jaw. When the jaws have reached their lowest position, the shoulder $j$ of the cam E will have passed and reached a position above the upper salient point, $g'$, of the tripping lever or device D, and upon the release of said jaw from the hand used in depressing or setting it the upward pressure exerted by the action of the springs of said jaws upon the cam-shoulder will be resisted to prevent said pressure from so turning the cam as to allow the escape of the cam-engaging jaw from said cam by said salient point $g'$ of the tripping-lever catching under the shoulder of the cam, the lower salient point, $g$, of the lever resisting downward movement of the lever, thus effecting the setting of the trap.

With the bait in place on the barbed bar $d$ of the platform C, and the trap set as just described, should an animal attempt to take the bait, (in order to do which it would have to step on the platform and between the clamping-jaws,) the platform would be depressed, in turn releasing the outer end of the tripping-lever, which would free the salient point $g'$ thereof from the shoulder $j$ of the cam E, when the upward pressure of the jaw bearing in the notch of the cam would instantly revolve the cam and simultaneously permit both jaws to spring or fly together, and thus embrace and secure the animal, the tilting platform being returned to its normal horizontal position by its spring.

Having thus fully described our invention, what we claim, and desire to secure by Letters Patent, is—

1. In an animal-trap, the platform A, apertured studs $a\ a$, the pivoted jaws B, and spring $a'$, in combination with the tilting platform, the barbed bait-bar $d$, spring $f$, and cam E, substantially as shown, and for the purpose described.

2. In an animal-trap, the combination of the notched and shouldered cam, the clamping-jaws, one engaging with said cam, the spring $a'$, and the tripping-lever having the tilting platform and adapted to engage with the cam-shoulder, substantially as and for the purpose set forth.

3. The jaws B B, in combination with the spring $a'$, the tilting platform C, and shouldered cam E, substantially as shown and described.

In testimony whereof we affix our signatures in presence of two witnesses.

ENOS A. COOK.
JAMES D. SHOOTS.
DEWITT STARING.

Witnesses:
DE WITT C. CURTIS,
J. H. OWEN.